United States Patent [19]
Jagielinski et al.

[11] Patent Number: 5,698,839
[45] Date of Patent: Dec. 16, 1997

[54] MAGNETICALLY ENCODABLE CARD HAVING MAGNETIC PIGMENT UNIFORMLY DISPERSED IN PLASTIC

[75] Inventors: Tomasz Mark Jagielinski, Carlsbad; Frederick John Jeffers, Escondido, both of Calif.; Robert Owen James, Rochester, N.Y.

[73] Assignee: Eastman Kodak Company, Rochester, N.Y.

[21] Appl. No.: 418,336

[22] Filed: Apr. 7, 1995

[51] Int. Cl.⁶ .................................................. G06K 19/06
[52] U.S. Cl. ........................................... 235/493; 235/449
[58] Field of Search ........................... 235/493, 449, 235/492; 428/692, 693, 694

[56] References Cited

U.S. PATENT DOCUMENTS

| | | | |
|---|---|---|---|
| 3,601,913 | 8/1971 | Pollock | 40/2.2 |
| 3,860,796 | 1/1975 | Wallace et al. | 235/61.12 M |
| 3,975,574 | 8/1976 | Saluke | 428/483 |
| 4,114,032 | 9/1978 | Brosow et al. | 235/493 |
| 4,218,674 | 8/1980 | Brosow et al. | 340/149 A |
| 4,281,043 | 7/1981 | Deffeyes | 428/457 |
| 4,444,670 | 4/1984 | Moslener | 252/62.54 |
| 4,522,428 | 6/1985 | Small et al. | 283/82 |
| 4,820,912 | 4/1989 | Samyn | 235/449 |
| 5,235,243 | 8/1993 | Tong | 313/479 |
| 5,272,216 | 12/1993 | Clark, Jr. et al. | 525/62.54 |
| 5,434,917 | 7/1995 | Naccache et al. | 380/23 |
| 5,473,147 | 12/1995 | Hoshino et al. | 235/449 |
| 5,480,685 | 1/1996 | Suzuki et al. | 427/548 |

FOREIGN PATENT DOCUMENTS 2829778  1/1980  Germany.

*Primary Examiner*—Donald T. Hajes
*Assistant Examiner*—Karl Frech
*Attorney, Agent, or Firm*—William F. Noval

[57] ABSTRACT

A magnetically encodable card made of a solid plastic material having uniformly dispersed magnetic particles throughout the plastic material. The card is preferably formed of two major faces with connecting edges. Data can be recorded on one or both of the major faces, and can also be recorded on one or more of the card edges.

12 Claims, 3 Drawing Sheets

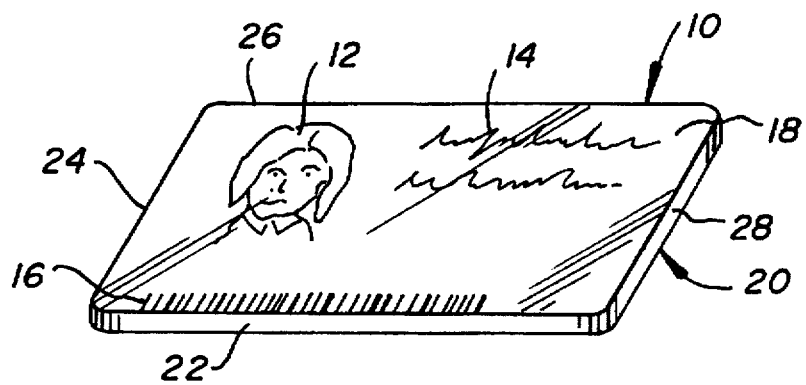
Fig. 1
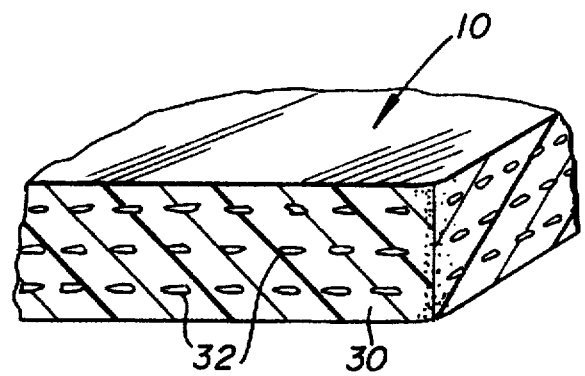
Fig. 2
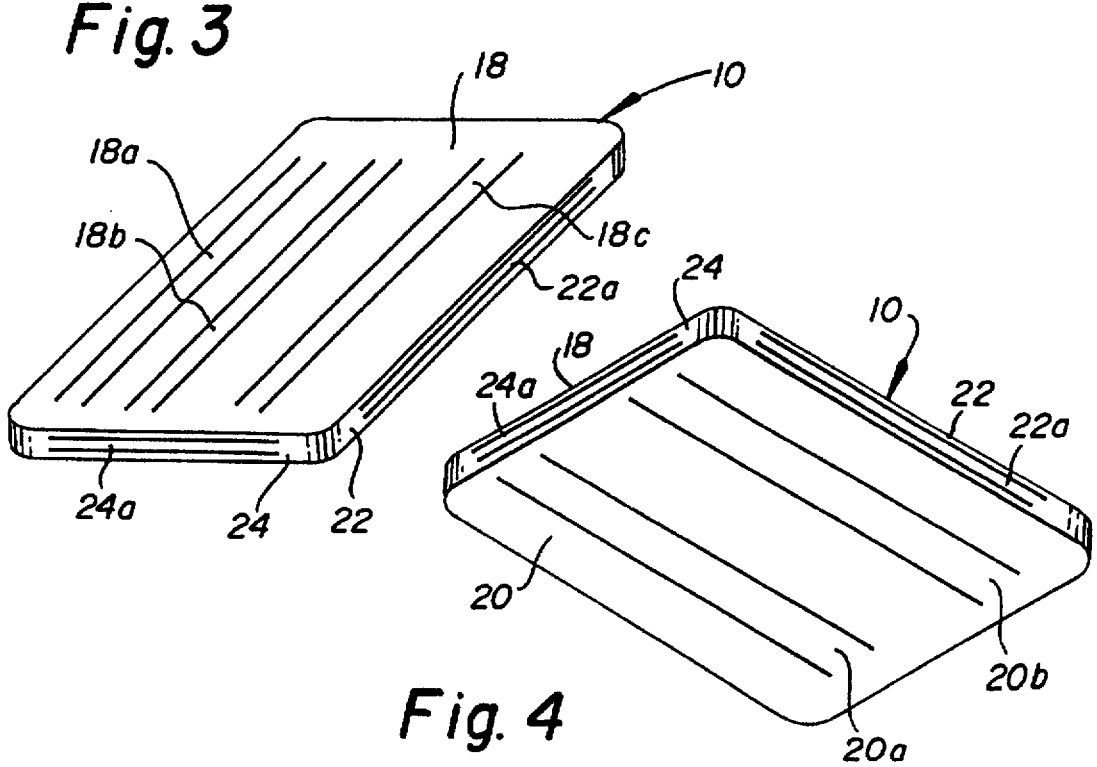
Fig. 3
Fig. 4

MAGNETICALLY ENCODABLE CARD HAVING MAGNETIC PIGMENT UNIFORMLY DISPERSED IN PLASTIC

FIELD OF THE INVENTION

The invention relates in general to magnetically encodable cards such as credit cards, debit cards, personal I.D. cards, employee security passes, door access cards, plastic money, chip cards for casinos, etc. More particularly this invention relates to a new and improved magnetically encodable card of solid plastic, having magnetic particles uniformly dispersed throughout the plastic card.

BACKGROUND OF THE INVENTION

Magnetically encoded cards, such as credit cards, debit cards, personal identification cards, employee passes, security cards, door access cards, plastic money, casino chip cards, etc., have typically contained a magnetic strip on the back, to record magnetically encoded data. Such data can, for example, include the credit or debit card number, a personal identification number, an employee number, an access code, a security code, graphics, photo, money limits, as well as other information relating to the person and to the application of the card. One disadvantage of using a magnetic strip is that it is clearly visible and easy to change or erase the recorded information. Another disadvantage is that continued use of the card by swiping the magnetic strip through a reader causes degradation of the magnetic stripe and information recorded thereon. A further disadvantage is the limited recording capacity of the single magnetic strip.

The following patents disclose the use with identification cards of various magnetic layers or strips which do not satisfactorily solve the problems of the conventional magnetic strip card. U.S. Pat. No. 3,975,574 issued Aug. 17, 1976, inventor Saluke, discloses a magnetic coating for credit cards, including a magnetic coating comprised of magnetic pigments in a plastic binder placed on a transfer base. This type of credit card is disadvantageous in the likelihood of delamination of the magnetic coating from the transfer base. U.S. Pat. No. 4,522,428, issued Jun. 11, 1985, inventors Small et al., discloses a plastic identification card having a magnetic encoding panel printed by screen printing in a drop out area in a transparent protective coating. This type of magnetic plastic I.D. card suffers the same disadvantages listed above of conventional magnetic strip I.D. cards. U.S. Pat. No. 3,860,796, issued Jan. 14, 1975, inventors Wallace et al., discloses a plastic or cardboard credit card having indentations filled in with finely divided magnetic particles. This credit card is disadvantageous in the complexity and cost in manufacturing the credit card. U.S. Pat. No. 3,601,913, issued Aug. 31, 1971, inventor Pollock, discloses a magnetic transaction card formed with an identification article of non-magnetic material and with a layer of magnetic material on the identification article. This card suffers the disadvantage of delamination of the magnetic layer from the non-magnetic article. German Offenlegungsschrift 2829778, laid open Jan. 17, 1980, discloses a credit or identity card carrying machine readable information and containing paper ply with plastic coating filled with fluorescent material of coarsely granular magnetic pigments. This card also suffers the disadvantages of delamination and magnetic layer degradation with increased use.

The following patents disclose various plastic articles having magnetic particles distributed in the plastic but which do not suggest such use in an ID card. U.S. Pat. No. 5,272,216, issued Dec. 21, 1993, inventors Clark, Jr., et al.; U.S. Pat. No. 4,444,670, issued Apr. 24, 1984, inventor Moslener; and U.S. Pat. No. 5,235,243, issued Aug. 10, 1993, inventor Tong.

There is thus a problem in providing a magnetically encodable card which is simple and inexpensive to manufacture, which has a long life without degradation of the magnetic layer or data recorded thereon, which eliminates delamination, and which provides expanded data recording capability.

SUMMARY OF THE INVENTION

According to the present invention, there is provided a solution to the problems of the prior art. According to an aspect of the present invention, there is provided a solid plastic magnetically encodable card having magnetic particles uniformly dispersed throughout the plastic card.

According to another aspect of the present invention, the magnetic particles dispersed in plastic are of a high coercivity magnetic material, such as barium ferrite, to provide increased security by increased resistance to demagnetization of recorded information. However, low (e.g., gamma iron oxide) and medium (e.g., cobalt-modified gamma iron oxide) coercivity material can also be used. According to still another aspect of the present invention, the magnetically encodable card also has dispersed in it a material which provides a low reflection density surface so that pictorial information can be printed on a face of the card.

According to another aspect of the present invention, data is recorded on the edges of the card having uniformly dispersed magnetic particles therein.

According to another aspect of the present invention, the concentration of the magnetic particles in the card is low, or very low, to prevent contact duplication even if high coercivity particles are used. The card can also have a magnetic strip or memory chip added.

These and other aspects, objects, features and advantages of the present invention will be more clearly understood and appreciated from a review of the following detailed description of the preferred embodiments and appended claims, and by reference to the accompanying drawings.

Advantages

The card according to the present invention has significant advantages over conventional I.D. cards having magnetic stripes. It is simple and inexpensive to manufacture it, it has a long life without degradation of the magnetic particles or data recorded thereon, it eliminates delamination, and it provides expanded data recording capability. Data can be written on the entire surfaces or edges of the cards without the addition of a magnetic stripe. Thus, the entire surface of the card can be used for image printing. Moreover, the amount of data that can be ultimately stored on the card according to the present invention is much higher than conventional cards, even at the same data density, since many more tracks can be added. Additionally, the life of the card is substantially increased over conventional cards because the entire volume of the card would have to be worn away before the magnetic media would be gone. Conventional cards can easily have the thin magnetic stripe worn off during normal usage. A further advantage of the card of the present invention, solves two problems of the credit card industry, i.e., stray field erasure and contact duplication. It has been found that 60% of card failures are due to having the magnetic stripe erased by stray fields. This problem can be solved by using high coercivity media for the magnetic stripe however, this makes duplication easier by contact duplication on a lower coercivity media. Therefore, much of the credit card industry does not use high coercivity media. In the card of the present invention, a high (4000 Oersted) media can be used to prevent stray field erasure without concern of contact duplication. Because the concentration of magnetic media is so low, the field from the card is too small to make duplicates on a second magnetic media. Since the particles are dispersed in the entire volume of the cards, even the accidental erasure of the surface of the card will not erase the information in the volume (true for low density recording). In addition, a low density signal can be recorded inside the card as an additional security feature.

BRIEF DESCRIPTION OF THE DRAWINGS

In the detailed description of the preferred embodiments of the invention presented below, reference is made to the accompanying drawings in which like elements have like numbers.

FIG. 1 is a perspective view of a magnetically encodable card according to the present invention;

FIG. 2 is a cross-sectional view showing the uniform distribution of magnetic particles throughout the card of FIG. 1;

FIGS. 3 and 4 are perspective views of a card showing regions for recording on the major surfaces and edges of the cards;

DESCRIPTION OF THE PREFERRED EMBODIMENTS

Figure 5:
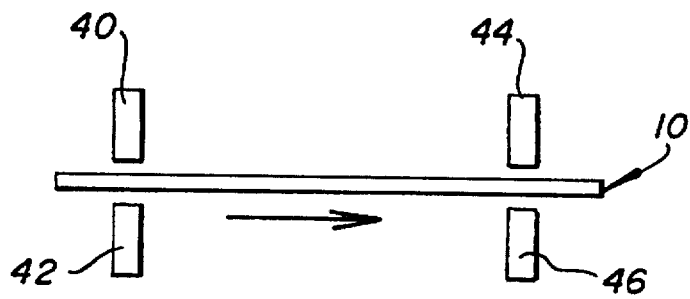
FIGS. 5 and 6 are respective side elevational and front elevational views of a system for recording on the major faces of a card according to the present invention.

Referring now to FIG. 1, there is shown a magnetically encodable card 10. Card 10 can encode any data, graphics, photos, etc., and can be used for any applications. Exemplary applications are a credit card, a debit card, a driver's license, an employee or personal I.D. card, security pass, door access card, plastic money, chip card for casino gambling, transportation card, etc. The card 10 can include printed matter on a surface thereof such as a photograph 12, written material 14, or a bar code 16. In general, card 10 includes two rectangular, elongated faces 18 and 20, and edges 22, 24, 26, and 28.

According to the present invention, card 10 is formed from solid plastic material 30 having magnetic particles 32 uniformly dispersed throughout the volume of card 10. Magnetic particles 32 may be of a high coercivity material such as barium ferrite or strontium ferrite, of a medium coercivity material, such as is used in the magnetic stripes of conventional ID cards or a very soft low coercivity material. Magnetic particles 32 may also be a mixture of low and high coercivity magnetic materials for recording of easy to erase and hard to erase data. Magnetic particles 32 may be made of materials having low and/or high Curie temperatures ($T_c$).

In accordance with the invention, any suitable ferromagnetic particle may be employed such as, for example, gamma-$Fe_2O_3$, cobalt-gamma-$Fe_2O_3$, Comagnetite; ferromagnetic chromium dioxide, ferromagnetic metal particles, ferromagnetic alloy particles, barium ferrite, strontium ferrite, and mixtures thereof, and the like. It is preferred that the magnetic particles have a coercivity greater than 3000 Oe, therefore, barium ferrite and strontium ferrite are preferred. It is also preferred that the volume of magnetic particle in the card be in a range from substantially 0.001 percent to substantially 0.1 percent and most preferably in a range from substantially 0.01 percent to substantially 0.03 percent based upon the volume of the resin employed in making the card. These ranges are supported by the examples of the invention disclosed in the subsequently mentioned U.S. patent application Ser. No. 08/418,731, filed 07 Apr. 1995, the contents of which are incorporated herein by reference. This is preferable because the low density of the magnetic particle allows the achievement of a neutral reflection density of the card, thereby permitting indecia, images, polygrams, and the like on the card without having the interference of color from the presence of the magnetic particles. The low loading of the magnetic particles into the resin from which the card is formed in these small percentages also gives low remanant fields and prevents the card made in accordance with this invention from use for duplicating or counterfeiting.

Any suitable thermoplastic resin may be employed as plastic material 30, such as, for example, polystyrene, polyamides, homo and copolymers of vinylchloride, polycarbonates, homo and copolymers of polyolefins, such as polyethylene, polypropylene, copolymers of ethylene and propylene; polyesters such as those prepared from dibasic carboxylic acids and divalent alcohols including succinic acid, dipic acid, phthalic acid, terephthalic acid, naphthalene dicarboxylic acid, and the lower alkyl esters thereof, and suitable glycols such as, for example, ethylene glycol, propylene glycol, butylene glycol, 1,4-cyclohexane dimethylol, polytetramethylene ether glycol, and the like; polyurethanes, and the like. Particular polyesters for use as a thermoplastic resin in accordance with this invention include polyethylene terephthalate, polyethylene naphthalate, and a copolymer of 1,4-cyclohexane dimethylol and ethylene glycol with terephthalic acid wherein the 1,4-cyclohexane dimethanol is used in a major amount.

Suitable metal oxide or mixtures of oxides may be added in order to provide a bright white reflective surface suitable for receiving indicia, images, and the like including, titanium dioxide either in the anatase or rutile form, zinc oxide, silica, oxides of aluminum, zirconium oxide, tin oxides, and nacreous pigments, such as mica/titanium dioxide or bismuth oxychloride. The plastic material 30 may also have dispersed therein particles that impart abrasion resistance and durability to the surface of the card for cleaning magnetic transducer heads so that digital information may be exchanged more reliably. Suitable such materials include powders, which are dispersed either into the dispersion or into the thermoplastic composite in accordance with the method of this invention such as, alpha alumina, gamma alumina, polycrystalline alpha-gamma alumina, aluminosilicates, titanium dioxide silica, tin oxide, antimony doped tin oxide, zirconium dioxide, chromium oxide, silicon nitride, and other powdered materials having a hardness generally greater than 6 on the MOH's scale.

Plastic material 30 can also include colored pigments or dyes to balance the optical reflection density in the visible region, thereby to provide desirable optical effects, including neutral density reflection for high light areas in image or pictorial information printed on the face of the information card such as blue dyes or pigments such as cobalt blue, ultramarine blue, or antimony doped tin oxide, or magenta dyes or pigments, such as, for example, quinacridone.

In order to provide low friction, sliding contact, between the card 10 and the head or transducer in the card reader or card writer, and thereby reduce surface scratching or marring, suitable lubricants may be incorporated therein, such as, for example, long chain fatty acids or esters thereof, such as, for example, stearic acid, metal stearates including zinc stearates, and the like. Polytetrafluoroethylene particles, silicone derivatives, and polymeric silicone compounds, such as polydimethylsiloxane, paraffin, carnauba wax, and the like.

According to a feature of the present invention, the magnetic particles are present at very low concentrations in the body of the plastic card 10. In order to provide a uniform signal envelope and appropriate resolution of flux reversals, it is important to provide uniform dispersion of deaggregated magnetic powder particles throughout the body of the card and across the surfaces and along the edges of the card.

Credit card 10 is preferably made by the following process which is disclosed in greater detail in commonly assigned, co-pending U.S. patent application Ser. No. 08/418,731, filed 07 Apr. 1995, entitled Method of Making Magnetically Encodable Card Having Magnetic Particles Uniformly Distributed Throughout, inventors R. O. James, M. I. Condo, B. D. West, and L. A. Rowley.

In general, the method for making magnetically encodable cards having ferromagnetic particles uniformly dispersed throughout includes the steps of forming a dispersion of ferromagnetic particles in an organic fluid medium, intimately combining the dispersion with a thermoplastic resin, the thermoplastic resin being plasticized by the organic fluid medium to form a composite, and fabricating the composite into a magnetically encodable card. The magnetically encodable card may also have dispersed therein various materials, such as abrasive particles, lubricants, dyes, and pigments that provide a reflective background so that pictorial information can be printed on a face of the card.

According to the present invention, since the magnetic particles 32 are uniformly distributed throughout the volume of plastic 30, magnetic information can be recorded at any region on either face 18 or 20 thereof. Thus, instead of the limited recording area provided by the magnetic strip on a conventional card, a number of magnetic tracks can be provided on either or both surfaces 18 and 20 of card 10. Thus, as shown in FIG. 3, card 10 has three tracks 18a, 18b, and 18c on face 18, and (FIG. 4) two tracks 20a, and 20b on face 20. It will be understood that the number of tracks of recorded data shown in FIGS. 3 and 4 are illustrative only and that there may be less or more tracks. Moreover, the data need not be recorded in tracks, but can be recorded in any desired format.

According to another feature of the present invention, because the magnetic particles 32 are uniformly dispersed throughout plastic material 30 of card 10, data can also be recorded along the edges 22, 24, 26 and 28 of card 10. Thus, as shown in FIGS. 3 and 4, transverse edge 24 has a magnetic track 24a and longitudinal edge 22 has a longitudinal track 22a. It will be understood that data can also be recorded along edges 26 and 28.

Figure 6:
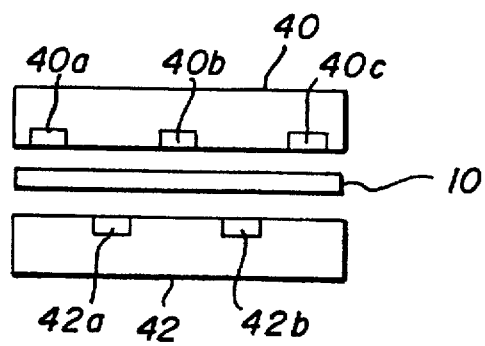

Referring now to FIGS. 5 and 6, there is shown a system for recording data on and for playing back data from the faces 18 and 20 of ID card 10. As shown, an upper record assembly 40 includes magnetic record heads 40a, 40b, and 40c for recording data respectively on recording tracks 18a, 18b, and 18c of card 10. Lower recording assembly 42 includes magnetic record heads 42a and 42b for recording data on record tracks 20a and 20b of card 10. Record heads 40a, 40b, 40c, 42a, and 42b may for example, be well known inductive type magnetic heads. As shown in FIG. 5, playback magnetic head assemblies 44 and 46 are provided to play back data recorded on card 10. Although not shown, upper playback magnetic head assembly 44 is provided with the same number of playback heads as record assembly 40 and playback magnetic assembly 46 is provided with the same number of playback magnetic heads as record head assembly 42. The playback heads of playback assemblies 44 and 46 can, for example, be inductive or magnetoresistive heads or sensors. It is also possible to record or playback a multiplicity of tracks by stepping the head or heads.

Figure 7:
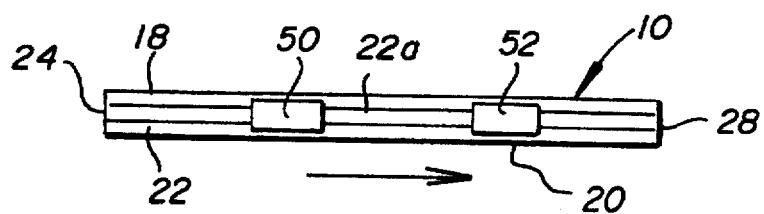
FIGS. 7 and 8 are respective side elevational and front elevational views of a system for recording on the edges of a card according to the present invention.
Figure 8:
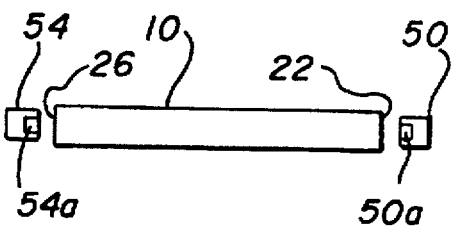

Referring now to FIGS. 7 and 8, there are shown edge recording and playback magnetic head assemblies. As shown in FIG. 7, a magnetic record head assembly 50 and a magnetic playback head assembly 52 is provided to record and play back data on track 22a of edge 22 of card 10. FIG. 8 shows magnetic record head assemblies 50 and 54 having respective record heads 50a and 54a for recording data on edges 22 and 26 of card 10.

In general, card recording is done in a card writer, while reproduction of information is done in a separate card reader. The card reader can have single or multiple heads.

Other additives may be added to plastic 30 of card 10 in order to customize the its properties. For example, titanium dioxide may be added to plastic 30 in addition to magnetic particles 32 to whiten card 10 so that images 12, 14 and 16 on surface 18 thereof, are reflected by the white background. Moreover, other colored dyes, antioxidants, anti-static agents, lubricants, and thermally responsive materials may be added to plastic 30 to provide suitable properties of card 10 to satisfy different applications thereof. By using magnetic particles 32 of high coercivity, information once recorded cannot be re-recorded or easily erased due to the card thickness.

As used in this application, the phrase "uniformly dispersed throughout", as applied to the present invention, may be determined by means of a d.c. magnetization measurement test. In this test, the magnetically encodable card 10 is uniformly magnetized with a high or saturation d.c. field, for example, at 11 kilooersted, in which the field is parallel to the length of the card. The card is passed through a card reader and the resultant signal analyzed. If magnetic particles are present in large aggregates, these aggregates act as a large local magnetic dipole. When the card is passed through the card reader, the higher flux changes causes a higher RMS (root mean square) signal. Conversely for small well dispersed and distributed particles, the local flux changes are much smaller and when such a card is passed through a card reader, the signal is much smaller and less variable giving as a result a small RMS signal.

Figure 9:
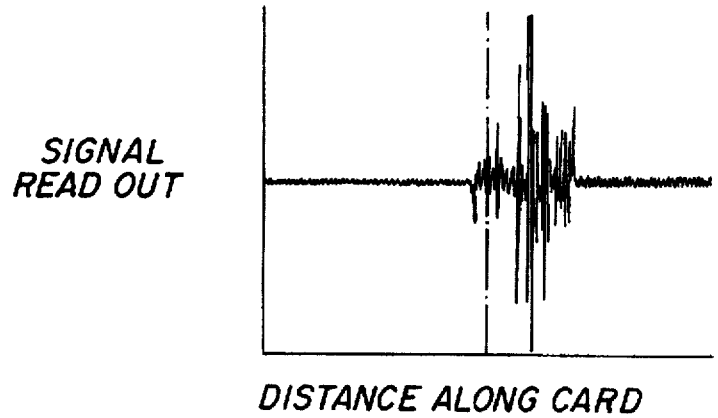
FIGS. 9, 10, and 11 are graphical views useful in explaining the present invention.
Figure 10:
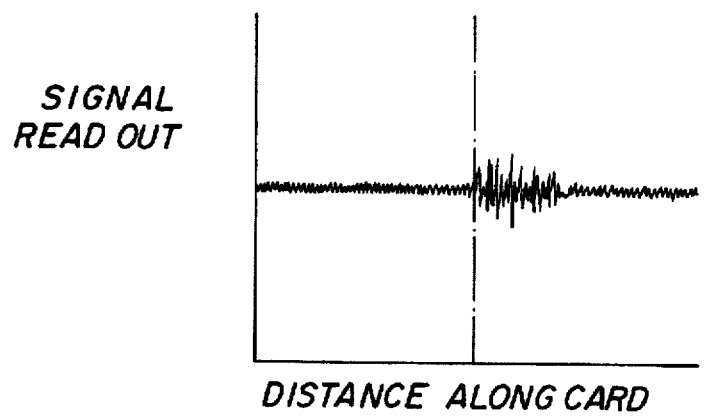
Figure 11:
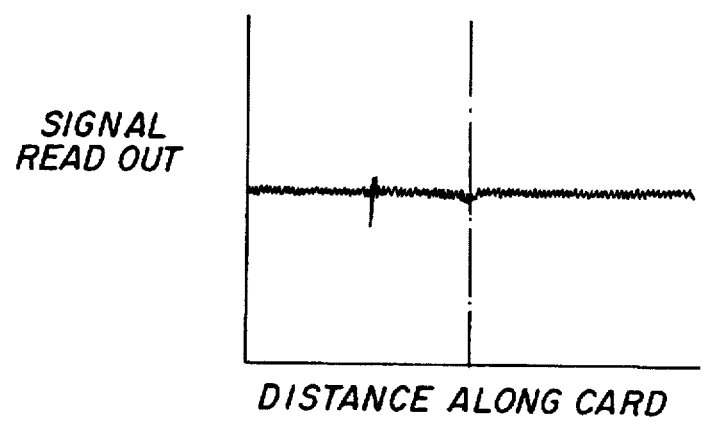

Referring to FIGS. 9, 10 and 11, there are shown graphical views illustrating the results of such a test on cards made, respectively, not according to the invention (FIG. 9), and according to the invention (FIGS. 10 and 11). The graphs are plots of signal read out versus distance along the card.

FIG. 9 is the test results of a card made as follows:

From 84% by weight of high density polyethylene sold by solvate under the grade designation Solvay T50-4400 and 16% by weight of magnetic particles sold by Toda Kogyo Corp. under the grade designation MC-140 are dry mixed together and introduced into a Welding Engineers Inc. twin screw compounding machine having counter-rotating non-intermeshing flights. The temperature of the melt was 426° F. and the barrel profile range for the extruder was 384°–415° F., and the material is extruded through an orifice and topped to prepare pellets of high density polyethylene containing the magnetic particles.

A double reverse flight compounding section was added to the screw profile of the twin screw compounder to improve polymer-additive mixing through intense shear. Sufficient high density polyethylene pellets containing the Toda Kogyo Corp. magnetic particles MC-140 prepared above to provide a final magnetic concentration of 0.132%, 14.85% of titanium dioxide and the balance high density polyethylene are compounded directly in the Welding Engineers twin screw compounding machine and injection molded into a mold in the configuration of the card in a 250 ton VanDorn molding machine using an ASTM plaque, thickness 0.030", 3" long, and 2" wide.

FIGS. 10 and 11 are test results of cards, according to the invention, Examples 2 and 9 of the above-referenced application Ser. No. 08/418,731, filed 07 Apr. 1995, entitled Method of Making Magnetically Encodable Card Having Magnetic Particles Uniformly Distributed Throughout, inventors R. O. James, M. I. Condo, B. D. West, and L. A. Rowley.

Each card was magnetized with a d.c. field of 11,000 Oersted. The cards were swiped through a card reader. The card reader is equipped with a 15 mil trackwidth magneto-resistive head providing media noise limited performance. The graphs of FIGS. 9, 10 and 11 represent the resultant signal. For each card, the output signal voltage was measured and analyzed for the Root Mean Square (RMS) value. System noise level was about 4 mV RMS. The RMS values for each card are given in Table I.

TABLE I

| Sample | RMS (mV) |
|---|---|
| FIG. 9 | 60.1 |
| FIG. 10 | 18.5 |
| FIG. 11 | 10.4 |

Thus, the phrase "uniformly dispersed throughout" as applied to the disbursement of magnetic particles throughout a solid plastic card can be defined as a card which, when subject to the above described test, produces an RMS voltage no greater than 20 mV.

The invention has been described in detail herein with reference to the figures, however, it will be appreciated that variations and modifications are possible within the spirit and scope of the invention.

We claim:

1. A magnetically encodable card comprising a body having upper and lower surfaces and first, second, third, and fourth edges, said body being formed of a plastic material having magnetic particles non-randomly, uniformly dispersed throughout the plastic material and capable of magnetically recording data.

2. The magnetically encodable card of claim 1, wherein the volume of said magnetic particles in said plastic material is in a range from substantially 0.001 percent to substantially 0.10 percent by volume of said plastic material, not affecting the plastic transparency or color of the plastic material.

3. The magnetically encodable card of claim 1, wherein said volume of magnetic particle in said plastic material is in a range from substantially 0.01 percent to substantially 0.03 percent by volume of said plastic material.

4. The magnetically encodable card of claim 1, wherein said magnetic particles are of high coercivity material having a coercivity greater than 3000 Oersted.

5. The magnetically encodable card of claim 1, wherein said magnetic particles have a coercivity of less than 3000 Oersted.

6. The magnetically encodable card of claim 1, wherein said magnetic particles have very low coercivity of less than 1 Oersted.

7. The magnetically encodable card of claim 1, wherein said data is magnetically recorded on one or more of said surfaces of said card.

8. The magnetically encodable card of claim 1, wherein data is magnetically recorded on at least one of said edges of said card.

9. The magnetically encodable card of claim 1, wherein said magnetic particles are of barium or strontium ferrite material or mixtures thereof.

10. The magnetically encodable card of claim 1 wherein said card includes a magnetic stripe.

11. The magnetically encodable card of claim 1 wherein said card includes a memory chip.

12. The magnetically encodable card of claim 1 wherein said card includes a magnetic strip and a memory chip.

* * * * *